(No Model.)
L. UNGER.
NUT LOCK.
No. 343,870. Patented June 15, 1886.
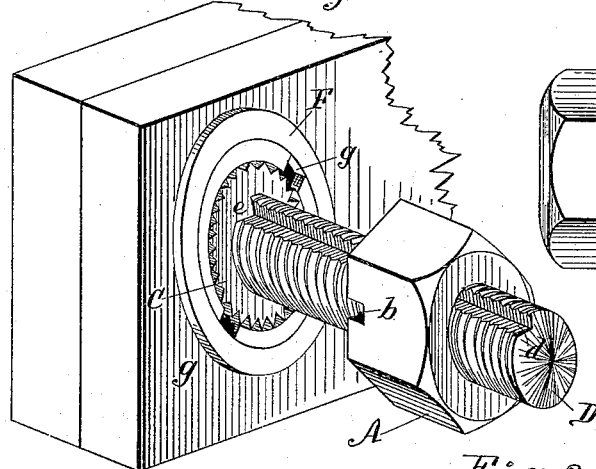
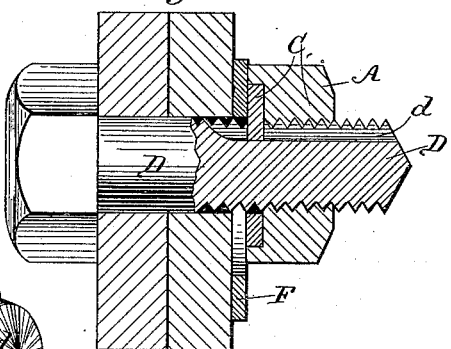
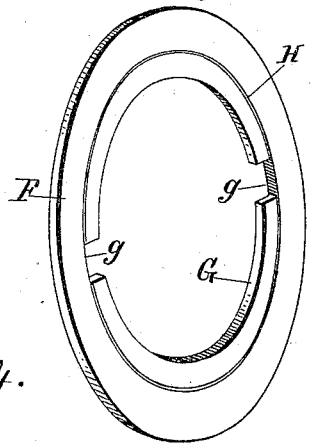
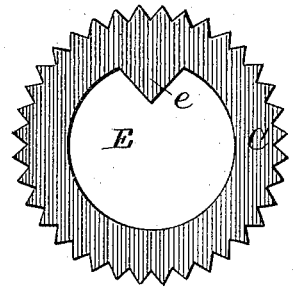
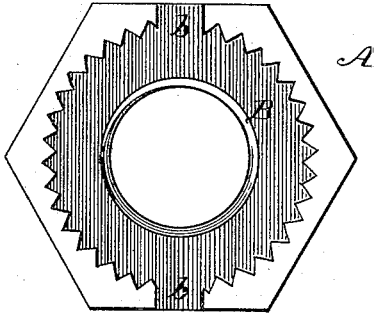
WITNESSES:
Thos. Houghton.
P. B. Turpin.
INVENTOR:
L. Unger
BY Munn & Co.
ATTORNEYS.

UNITED STATES PATENT OFFICE.

LOUIS UNGER, OF SAN ANTONIO, TEXAS.

NUT-LOCK.

SPECIFICATION forming part of Letters Patent No. 343,870, dated June 15, 1886.

Application filed January 2, 1886. Serial No. 187,500. (No model.)

*To all whom it may concern:*

Be it known that I, LOUIS UNGER, a citizen of the United States, residing at San Antonio, in the county of Bexar and State of Texas, have invented a new and useful improvement in Nut-Locks, of which the following is a description.

My invention is an improvement in nut-locks; and it consists in certain features of construction and novel combinations of parts, as will be described and claimed.

In the drawings, Figure 1 is a perspective view of the invention ready for use, the nut being on the bolt, but unlocked. Fig. 2 is a sectional view of the construction shown in Fig. 1, the parts being shown in locked position. Fig. 3 is a detail perspective view of the securing-plate; Fig. 4, a detail face view of the locking-washer; and Fig. 5, a view of the rear face of the nut, all of which will be described.

The nut A, in carrying out my invention, is formed in its rear face with a non-circular recess, B, having its walls preferably formed with teeth or serrations, as shown most clearly in Fig. 5. From this recess a notch or notches, $b$, extend to the side of the nut, for the purpose hereinafter described. The locking-washer C has its edge formed to fit those of the recess B in such manner that when it is in such recess it will be held from turning. This washer is adapted to be held from turning on the bolt D, preferably by forming its opening E, which fits over said bolt, with a key, $e$, to enter the key-seat $d$ of the bolt.

The securing-plate F is formed with an opening, G, fitted to receive the washer C, and it has a notch or notches, $g$, extended outward from said opening. On the face of this plate is inscribed, preferably by cutting therein, as shown, a guide-line, H.

In use the locking-washer and securing-plate are placed on the bolt up against the object to be turned, the washer C being within the plate F, as shown in Fig. 1. The nut is now turned up against the said parts, when the washer C is adjusted into the recess B of the nut, and the securing-plate falls or may be forced in rear of the washer, securing it in the nut, and the parts assume the position shown in Fig. 2. Manifestly on easily movable structures, the locking-washer may be adjusted into the recess of the nut by turning the work to bring the nut below said washer, so it will fall by gravity, and the reverse of such operation will move the locking-washer out of the recess of the nut; but I prefer to secure such end in the manner now to be described.

When the washer and plate are as shown in Fig. 1 and the nut is turned up thereagainst by means of a suitably-formed implement inserted through notch $g$, the washer C may be slipped into recess B, when the securing-plate will fall or may, by the tap of a hammer, be forced in rear of the washer and secure it in locked position. When it is desired to unlock the nut, the plate F is raised until its guide-line H registers with the edge of the nut. This indicates that the opening G and the outer edge of the washer C are in register. Now, by a suitable implement passed through notch $b$, the washer C may be adjusted into opening G and the nut will be released. When the parts are in locked position, the plate F serves as a bearing-washer between the nut and the object to be fastened, as well as a means of securing the locking-washer in engagement with the nut.

Having thus described my invention, what I claim as new is—

1. A lock, substantially as described, for a nut having a non-circular recess in its rear face, consisting of a washer having a non-circular opening whereby it may be keyed upon a bolt and fitted to enter the non-circular recess of the nut, and a securing-plate having an opening fitted to receive the locking-washer, as and for the purposes specified.

2. The combination of a nut having a non-circular recess in its rear face, having a notch extending therefrom to the side of the nut, a locking-washer adapted to be keyed upon a bolt and having its edge fitted to the recess of the nut, and the securing-plate having an opening fitted to receive the locking-washer and provided with a notch extended from the said opening, substantially as set forth.

3. The combination of a nut having its rear face recessed, a locking-washer movable into and out of said recess, and a securing-plate having an opening fitted to receive the locking-washer and having a guide-line arranged to indicate in connection with the locked nut when the locking-washer and the opening in the securing-plate are in register, substantially as set forth.

4. A lock for a nut, having a recessed rear face consisting of a locking-washer formed to fit in the recess of said nut and a securing-plate adapted to secure such washer in the recess of the nut, and to serve as a bearing-washer for said nut, substantially as set forth.

LOUIS UNGER.

Witnesses:
R. J. SIBERT,
A. E. STAACKE.